(12) United States Patent
Talken

(10) Patent No.: US 7,150,383 B2
(45) Date of Patent: Dec. 19, 2006

(54) STORABLE TRANSFER CONVEYOR SYSTEM

(75) Inventor: Daniel J. Talken, Lafayette, CA (US)

(73) Assignee: Geo M. Martin Company, Emeryville, CA (US)

(*) Notice: Subject to any disclaimer, the term of this patent is extended or adjusted under 35 U.S.C. 154(b) by 191 days.

(21) Appl. No.: 10/663,003

(22) Filed: Sep. 15, 2003

(65) Prior Publication Data
US 2005/0056677 A1   Mar. 17, 2005

(51) Int. Cl.
B26F 3/00 (2006.01)
B26F 3/02 (2006.01)
B65G 21/14 (2006.01)

(52) U.S. Cl. ........................ 225/93; 225/106; 198/588; 198/812

(58) Field of Classification Search ................ 225/1, 225/101, 102, 103, 100, 93, 106; 414/794.5, 414/114, 119, 117, 118, 120, 400; 270/58.08; 198/588, 812, 581
See application file for complete search history.

(56) References Cited

U.S. PATENT DOCUMENTS

| | | | | |
|---|---|---|---|---|
| 1,712,241 | A | * | 5/1929 | Young et al. ................ 83/94 |
| 2,701,650 | A | * | 2/1955 | Stevenson, III ............. 53/496 |
| 2,721,645 | A | * | 10/1955 | Eberle ...................... 198/361 |
| 2,793,693 | A | * | 5/1957 | Menk ......................... 83/157 |
| 2,901,250 | A | | 8/1959 | Martin |
| 2,993,583 | A | * | 7/1961 | Sykes .................... 198/370.07 |
| 3,245,557 | A | * | 4/1966 | Maramonte et al. ...... 414/792.1 |
| 3,279,664 | A | * | 10/1966 | Lynch ...................... 225/96.5 |
| 3,297,174 | A | * | 1/1967 | Letchworth ............. 414/790.3 |
| 3,643,939 | A | * | 2/1972 | Nussbaum et al. ......... 271/157 |
| 3,670,611 | A | * | 6/1972 | Jarman ....................... 83/81 |
| 3,951,283 | A | * | 4/1976 | Lingl, Jr. ................. 414/802 |
| 3,982,750 | A | * | 9/1976 | Pulda ...................... 271/151 |
| 4,346,799 | A | * | 8/1982 | Dunville et al. .......... 198/367 |
| 4,842,572 | A | * | 6/1989 | Roth ........................ 493/357 |

(Continued)

OTHER PUBLICATIONS

U.S. Appl. No. 10/229,891, filed Aug. 28, 2002, Bundle Breaker Improvement, Merrill D. Martin et al., 50pgs (Specification, Claims, Abstract and Drawings), Notice of Allowance and Issue Fee Mailed Jul. 24, 2003.

(Continued)

Primary Examiner—Boyer D. Ashley
Assistant Examiner—Ghassem Alie
(74) Attorney, Agent, or Firm—James R. Cypher; Law Offices of James R Cypher

(57) ABSTRACT

A storable transfer conveyor system for moving bundles from an upstream conveyor to a downstream conveyor utilizing a storable transfer conveyor which is movable from a first operative position, wherein the bundles are transferred to the downstream conveyor, to a second stored position on top of the downstream conveyor. When the storable transfer conveyor is in the second stored position, nearly all of the floor space occupied by the storable transfer conveyor when it was in the first operative position is vacated and available for another use and for operators to freely traverse the formerly occupied floor space. Transfer of the storable transfer conveyor is preferably nearly entirely by powered conveyors, requiring very minimal manual effort on the part of the operators of the equipment. In some applications, the storable transfer conveyor may be manually pushed or pulled in and out of a stored position. Transfer of the transfer conveyor from the first operative position to the second stored position requires no additional floor space to effect the move. The transfer and its return requires no uncoupling and re-coupling of hydraulic hoses, power cables, or control cords.

13 Claims, 15 Drawing Sheets

U.S. PATENT DOCUMENTS

| | | | |
|---|---|---|---|
| 5,028,201 A * | 7/1991 | Hawthorne | 414/796 |
| 5,087,026 A * | 2/1992 | Wyer | 271/188 |
| 5,423,657 A * | 6/1995 | Frost et al. | 414/796.8 |
| 5,468,010 A * | 11/1995 | Johnson | 280/652 |
| 5,470,466 A * | 11/1995 | Schaaf | 210/222 |
| 5,490,592 A * | 2/1996 | Best et al. | 198/812 |
| 5,568,857 A * | 10/1996 | Chen et al. | 198/592 |
| 5,672,045 A * | 9/1997 | Schmid et al. | 414/794.5 |
| 5,954,473 A * | 9/1999 | Folsom | 414/788.9 |
| 5,971,691 A * | 10/1999 | Munson et al. | 414/398 |
| 5,979,606 A * | 11/1999 | Wheeler | 187/269 |
| 6,068,111 A * | 5/2000 | Smith et al. | 198/812 |
| 6,484,869 B1 * | 11/2002 | Brouwer et al. | 198/592 |
| 6,585,477 B1 * | 7/2003 | Lawrence | 414/793.1 |
| 6,655,566 B1 * | 12/2003 | Martin et al. | 225/101 |
| 2002/0140152 A1 * | 10/2002 | Martin et al. | 270/58.08 |
| 2003/0026682 A1 * | 2/2003 | Heston et al. | 414/791.6 |
| 2004/0182682 A1 * | 9/2004 | Chadwick | 198/588 |
| 2005/0123385 A1 * | 6/2005 | Kirsch | 414/573 |

OTHER PUBLICATIONS

BTS Bundle Take Aways System, Geo. M. Martin Company Advertisement Sheet, 1pg.
BTS Bundle Transfer System, Geo. M. Marting Company Advertisement Sheet, 2pgs.
BTS:Scissors Bundle Transfer System on Scissors Lift, Geo. M. Martin Company, 1pg.
Drawing of Martin Upstacker and Martin BTS: Scissors and Pit for BTS:Scissors, Geo. M. Martin Company, 1pg.

* cited by examiner

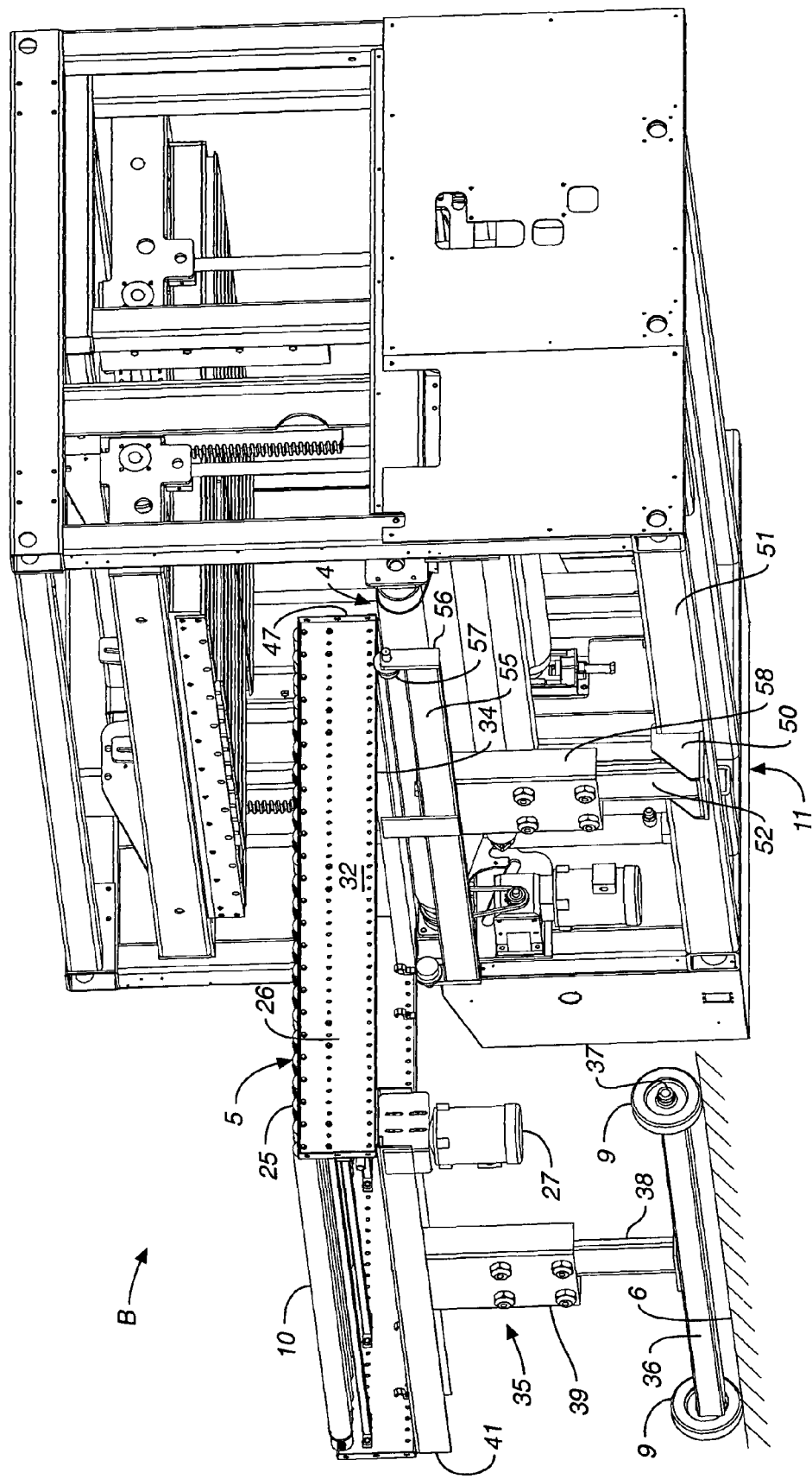

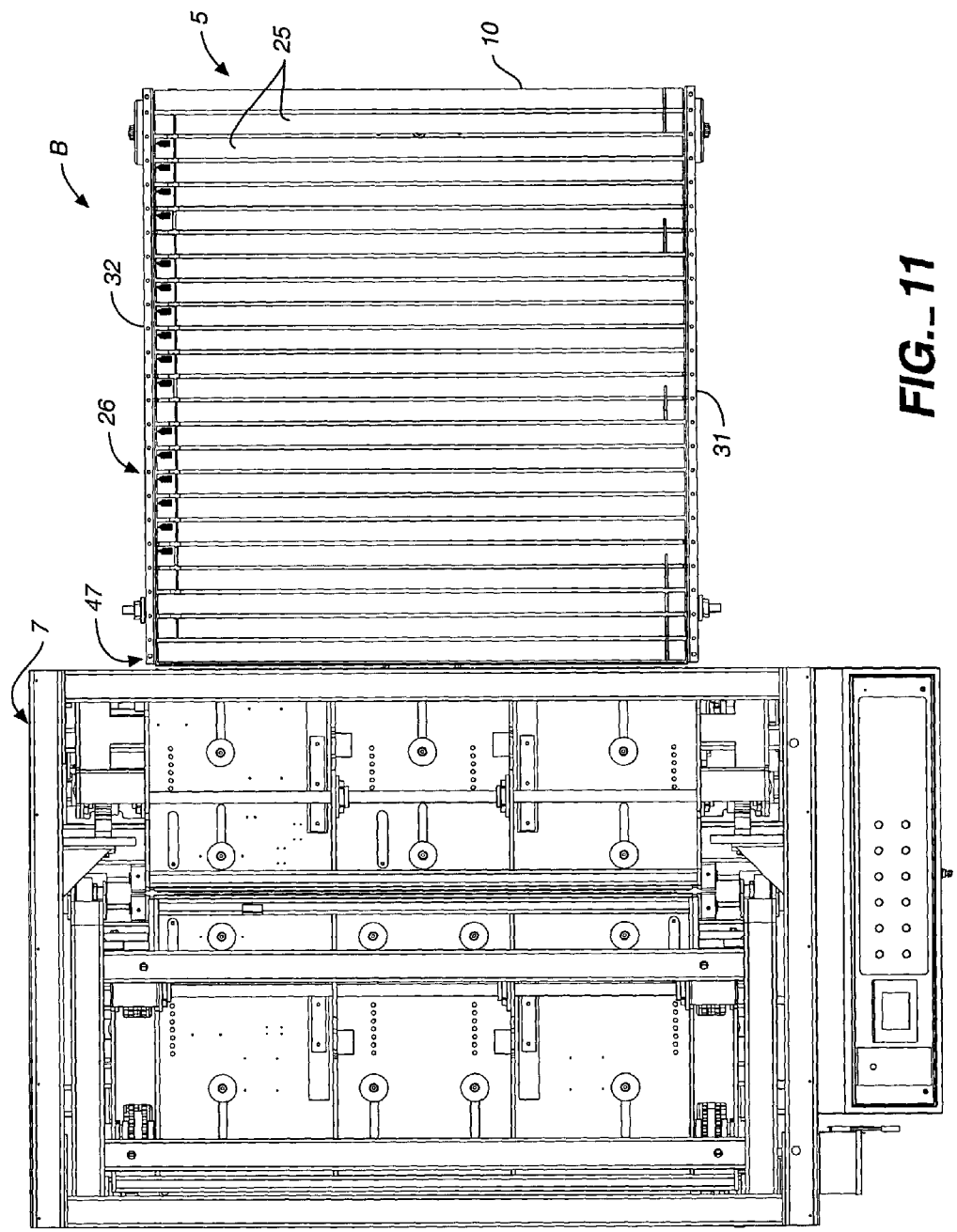
FIG._11

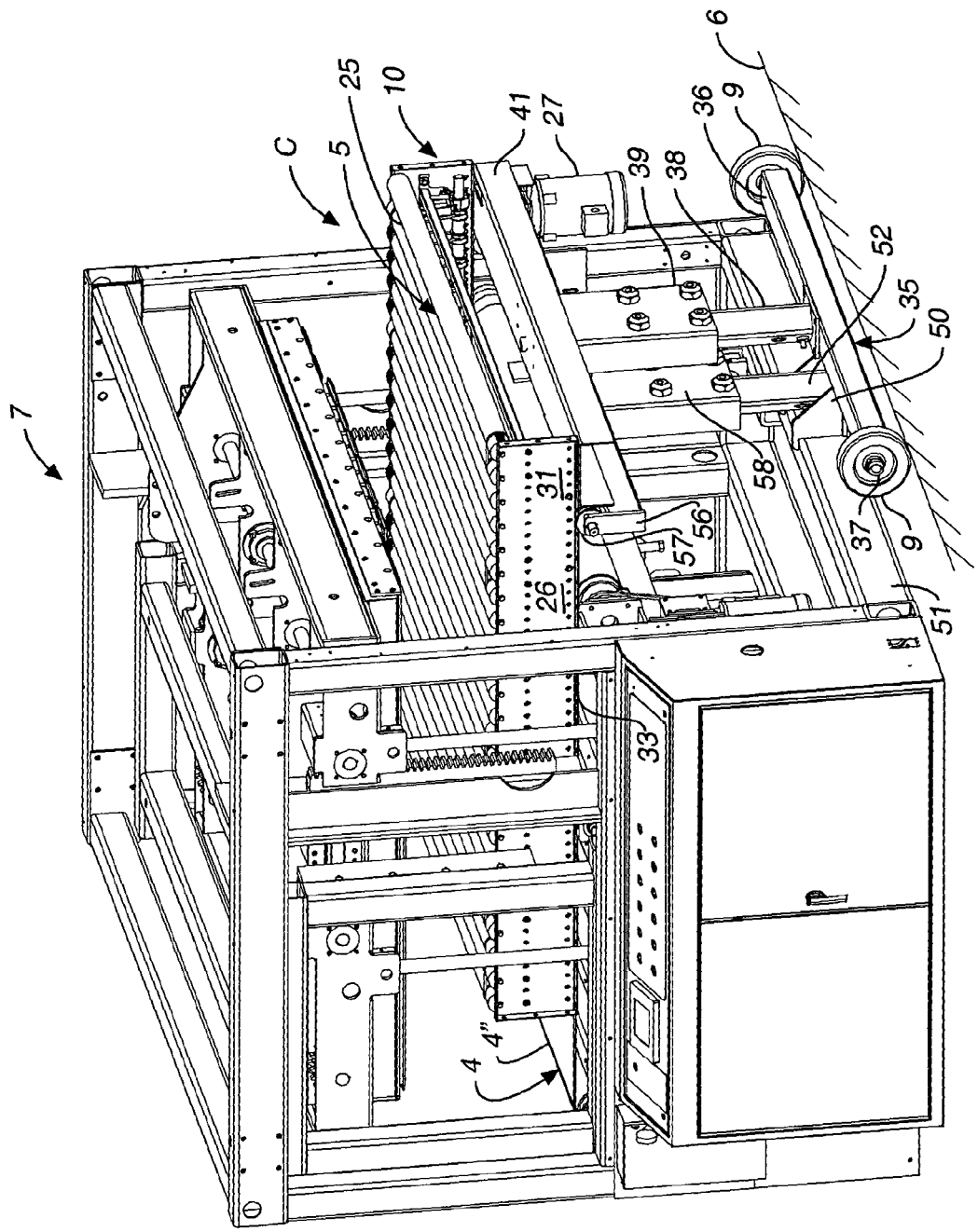
FIG._12

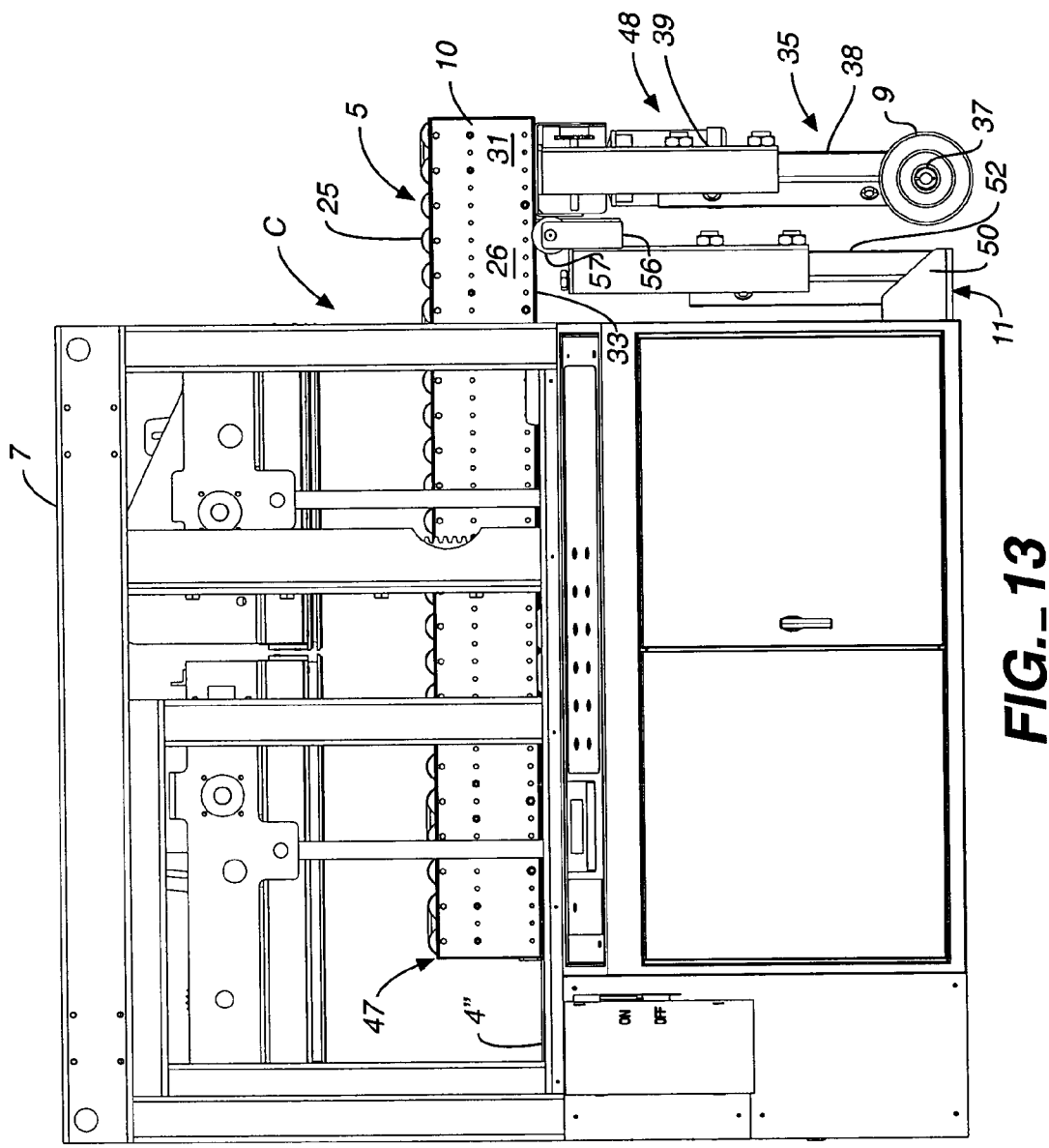
FIG._13

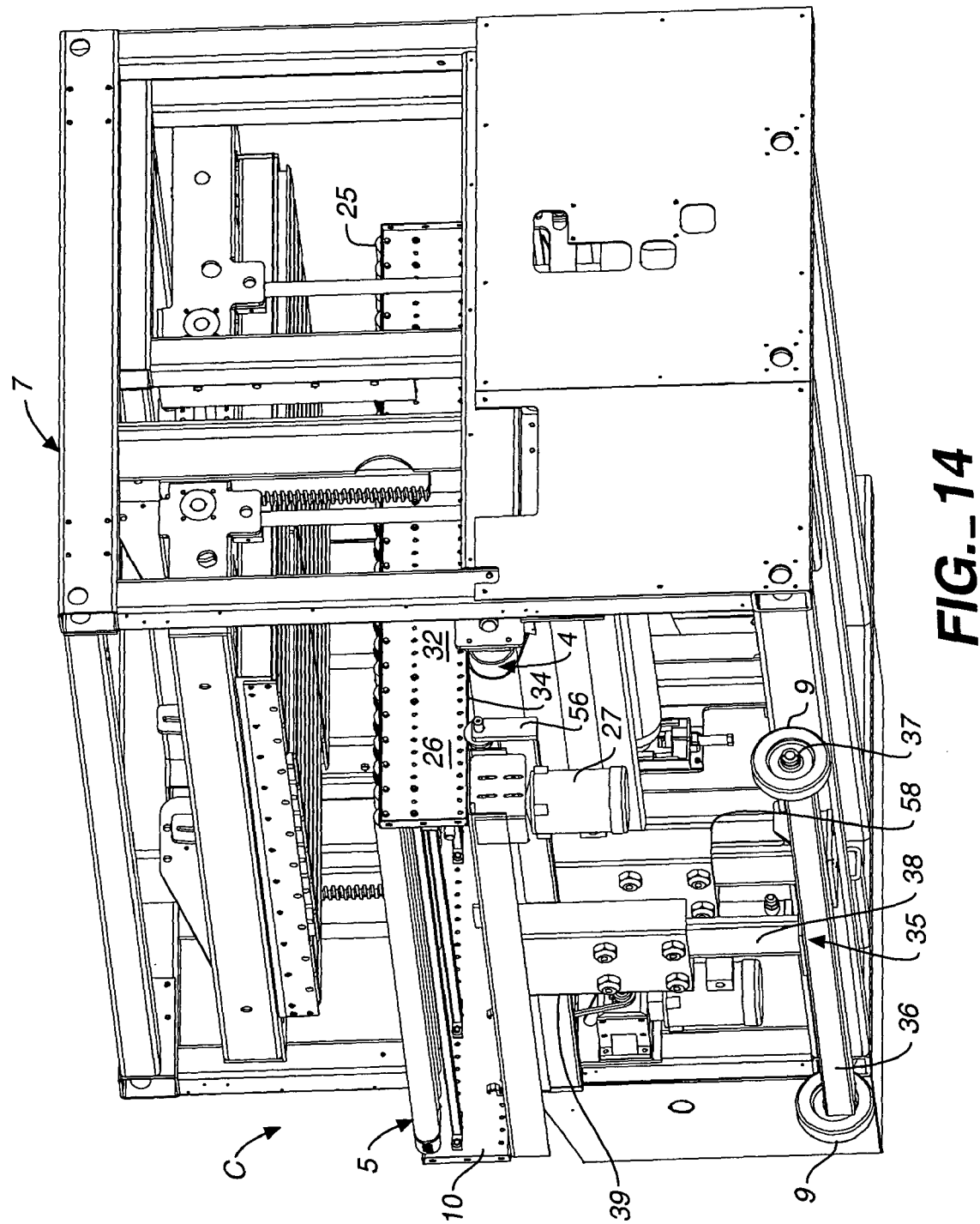
FIG._14

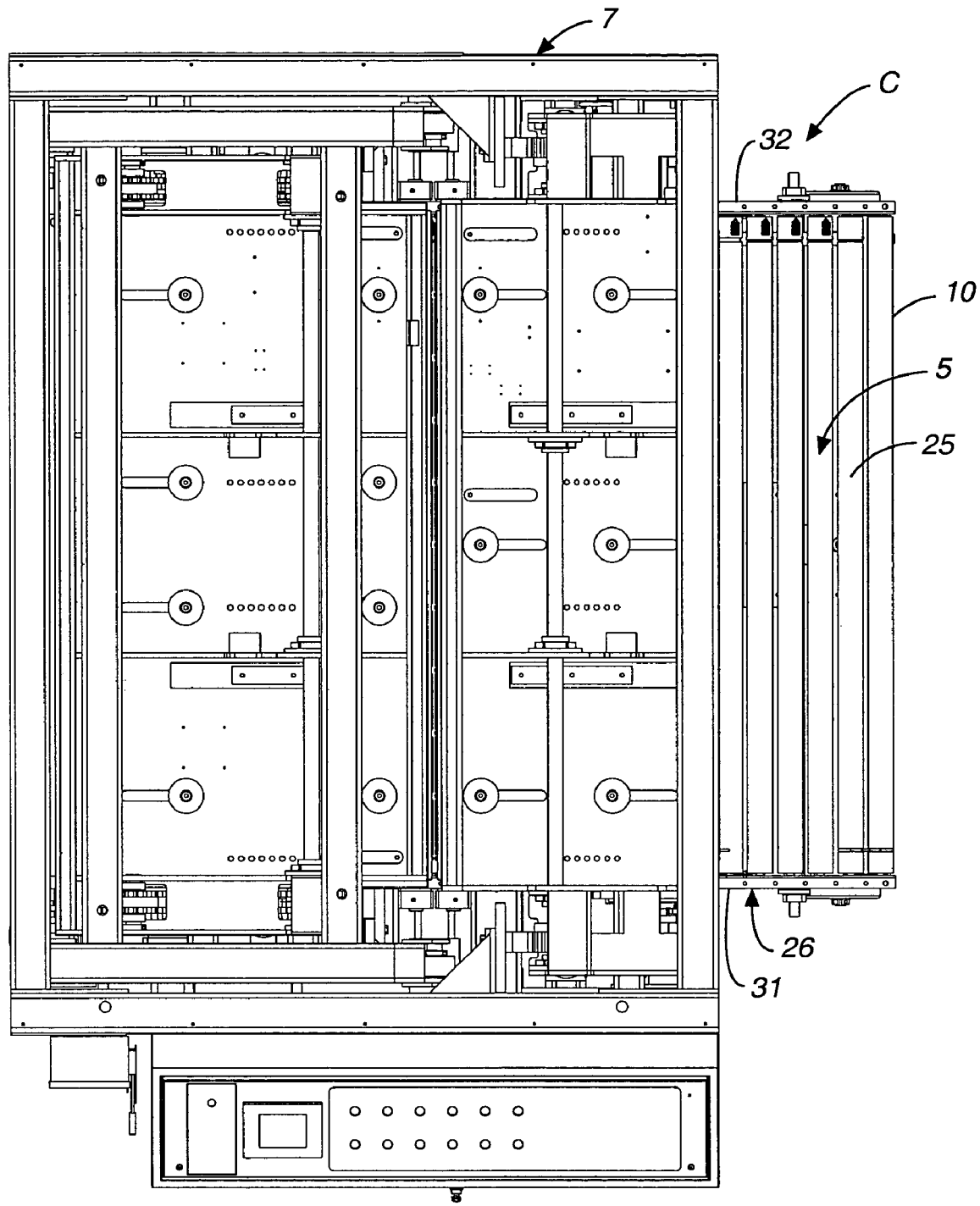
FIG._15

STORABLE TRANSFER CONVEYOR SYSTEM

This invention relates to a dual path transfer conveyor system for either moving full stacks of cardboard/corrugated from an upstream conveyor to a downstream conveyor or for moving bundles of perforated or nicked card board/corrugated to a bundle breaker machine located at a right angle to the upstream conveyor.

BACKGROUND OF THE INVENTION

It is common to stack cardboard sheets in full stacks which are then conveyed in a straight line by a floor level conveyor to another machine or stacked on pallets. One form of sheet stacker is found in U.S. Pat. No. 2,901,250 granted to Martin on Aug. 25, 1959.

It is also common, since as early as 1979 as shown in Schmidt, U.S. Pat. No. 4,136,604, to create small stacks of cardboard/corrugated (referred to as bundles and to move these bundles from the aforementioned stacker on an alternate path; to a bundle breaker machine where the bundles are separated along perforated or nicked lines into multiple bundles. There are several types of bundle breaker machines, some of which can be used with the present invention. One bundle breaker which can be used with the present invention is the Martin bundle breaker disclosed in U.S. Ser. No. 10/229,891 filed Aug. 28, 2002.

Martin et. al. Ser. No. 10/229,891 filed Aug. 28, 2002 was granted patent No. 6,655,566 on Dec. 2, 2003. Martin et. al. Ser. No 10/229,891 now U.S. Pat. No. 6,655,566 granted Dec. 2, 2003 is hereby incorporated by reference, in its entirety, into the present application.

The need to effect an easy periodic transition from moving full stacks from a stacker machine to straight line floor conveyors to moving perforated or nicked bundles to a bundle breaker has become progressively greater with the introduction of additional bundle breaking machines such as Vanhoutte of Brugge Belgium in European patent 292,067 in 1994; Lucas, U.S. Pat. No. 4,500,022 in 1985; Fernandez, U.S. Pat. No. 5,865,358 in 1999; Duecker, U.S. Pat. No. 5,927,582; granted Jul. 27, 1999; Shill, U.S. Pat. No. 6,019,267 granted in 2000 and Martin and Talken, U.S. Ser. No. 10/229,891 filed Aug. 28, 2002. Thus for the 24 years since Schmidt first introduced a bundle breaker machine, the persistent unsolved need for providing an easy way to transition the line set up from conveying full stack output from the stacker to conveying bundle output from the stacker to a bundle breaker machine has existed.

Prior to this invention, when it was desired to change from straight line removal of the full stacks on straight line floor conveyors to conveyance of bundles to a bundle breaker at a right angle, several different systems were in use. All of these systems required the use of a mobile roll out transfer conveyor which was wheeled into and out of the line set up. Often this mobile roll out transfer conveyor (hereafter "take away system or take away transfer conveyor) had to be stored at a relatively long distance from the stacker and bundle breaker.

One system which could be used was the Geo. M. Martin BOS™ Bundle Transfer System On Scissors Lift shown in FIG. 3 (Prior Art).

In FIG. 3, Prior Art upstacker 17 is discharging full stacks 18 onto a Geo. M. Martin BOS™ Bundle Transfer System On Scissors Lift, hereafter sometimes referred to as an upstream conveyor 3. As configured, the full stacks 18 proceed to a floor conveyor 20.

In the set up shown in FIG. 3 (Prior Art), the Prior Art mobile roll out take away transfer conveyor 64 is parked at a location 65 remote from both the prior art stacker 17 and the prior art unmodified bundle breaker 7' so that the operator 61 can move quickly and easily from his normal operating station near controls 59 or remote boom control station 59' along pathway 62 to a second station designated 61'.

When the production set up is changed, not shown, it generally takes two operators, several minutes to move the Prior Art mobile roll out take away transfer conveyor 64 from its parked remote location 65 to a position between the unmodified bundle breaker machine 7', and the Geo. M. Martin BOS™ Bundle Transfer System On Scissors Lift, or upstream conveyor 3.

In this second set up, not shown, the stacker 17 deposits bundles 2 onto a Geo. M. Martin BOS™ Bundle Transfer System On Scissors Lift 3. Bundles 2 proceed to the Prior Art mobile roll out take away transfer conveyor 64 and hence to prior art unmodified bundle breaker 7'.

The reason for removing the prior art mobile roll out take away transfer conveyor 64 after the production run of bundles 2 is completed is to permit the operator of the stacker to quickly move to the downstream end of the up stacker 17 should problems in the stacker occur. The operator must also be free to move beyond the downstream end of the stacker 17 and observe the operation of the downstream floor conveyors 20 and to return quickly to the controls 59 of the stacker 17 if necessary. The operator may also need to move adjacent to or even onto the upstream conveyor 3 to place dunnage boards on upstream conveyor 3 or place shipping tags on full stacks 18.

Periodic removal of even a small conveyor from one part of a crowded factory floor to another equally crowded part of the factory is a problem without an easy solution. As one production engineer recently stated, "real estate on a busy factory floor is more expensive than real estate in downtown San Francisco.". Thus the need for a way to store the prior art mobile roll out take away transfer conveyor 64 without taking up space on the factory floor is apparent.

Instead of moving a conveyor on castors to another part of the factory, some efforts have been made to permit the small roll out transfer take away conveyor to be mounted on a pivot and pivoted out of the way. Others have provided tilting mechanisms which tilt the small take away conveyor at an angle to take up less floor space. None of these measures have proved to be satisfactory.

Finally, but not less important, the present system is designed to reduce the chance of injury to the two or more workmen formerly in charge of moving the heavy mobile roll out takeaway transfer conveyor 64 from one part of the factory floor into position between upstream conveyor 3 and unmodified bundle breaker 7' and to other personnel on the factory floor who could be hit by the rolling heavy piece of machinery.

While this invention primarily addresses the problem of saving space on a factory floor where a bundle breaker machine is involved, the problem also may occur in any dual pathway situation where instead of a bundle breaker being the downstream side conveyor, the downstream conveyor is simply another conveyor.

SUMMARY OF THE INVENTION

The storable transfer conveyor of the present invention, is only used when the bundle breaker is in operation. When the bundle breaker is out of use, the storable transfer conveyor may be stored inside the bundle breaker. Thus, the very important objective of conserving space on the factory floor is achieved.

Another objective of the present invention is to be able to quickly and easily remove the storable transfer conveyor 5 from its operative position between the bundle transfer system on scissors lift machine and the bundle breaker machine and to store it in the bundle breaker machine and then to quickly and easily return it to an operative position between the bundle transfer system on scissors lift machine and the bundle breaker machine as needed.

A further object of the present invention is to store the storable transfer conveyor in the bundle breaker machine so that the operator of the stacker can easily move between the upstream side of the stacker to the downstream end and beyond without interference with the storable transfer conveyor stored in the bundle breaker machine. Using the present invention, it only takes less than two minutes to change between full stack and bundle operation or visa-versa.

A further object of the present invention is to provide a powered storable transfer conveyor which can be stored within the bundle breaker machine with only minor modification of the bundle breaker.

Still another object of the present invention is to provide a system requiring a minimum of effort by the operator with nearly all of the motive power in making the transfer supplied by the power driven belts in the bundle breaker machine.

A still further object of the present invention is to provide a system which eliminates the expensive quick disconnect couplings for the air supply, and electrical supply for the drive motors and electrical control wires used with the former takeaway system.

Another object is to reduce the replacement costs and maintenance costs required by the former takeaway system because of the damage and wear associated with connecting and disconnecting the electrical power and control cables as well as air lines which are part of the disconnect system.

Still another object is to eliminate damage to the take away transfer conveyor as well as damage done to other machines on the factory floor which occurred during movement of the take away transfer conveyor through crowded factory floors to a remote parking position.

A further, and very important objective is to reduce the hazard of injury to operating personnel who must move the heavy take away transfer conveyor and to other personnel on the floor of the factory floor who might be struck by the rolling machinery by eliminating the need to move the heavy take away transfer conveyor to a remote location on a busy crowed factory floor.

A still further object is to provide a storable transfer conveyor which may be manually pushed on rollers into the bundle breaker.

Still another object is to provide a storable transfer conveyor which is self powered and may be stored within the bundle breaker without the use of any manual labor.

BRIEF DESCRIPTION OF THE DRAWINGS

FIG. 10 is a perspective view of the bundle breaker machine of FIG. 8 taken from a different angle with the storable transfer conveyor of the present invention in a raised but not stored position.

FIG. 11 is a top plan view of the modified bundle breaker machine and storable transfer conveyor shown in FIG. 10.

FIG. 12 is a perspective view of the bundle breaker 7 and storable transfer conveyor 5 shown in FIG. 10 with the storable transfer conveyor 5 stored or parked inside the bundle breaker machine 7 on top of the downstream conveyor 4.

FIG. 13 is a side view of the bundle breaker 7 and storable transfer conveyor 5 of FIG. 12 stored or parked inside the bundle breaker 7.

FIG. 14 is a perspective view of the bundle breaker 7 and the storable transfer conveyor 5 shown in FIG. 12 stored or parked inside the bundle breaker 7 and taken from a different angle.

FIG. 15 is a top plan view of the bundle breaker 7 and the storable transfer conveyor shown in FIG. 14 with the transfer conveyor 5 shown in FIG. 14 with the storable transfer conveyor 5 stored or parked inside the bundle breaker 7.

DESCRIPTION OF THE PREFERRED EMBODIMENTS

Figure 2:
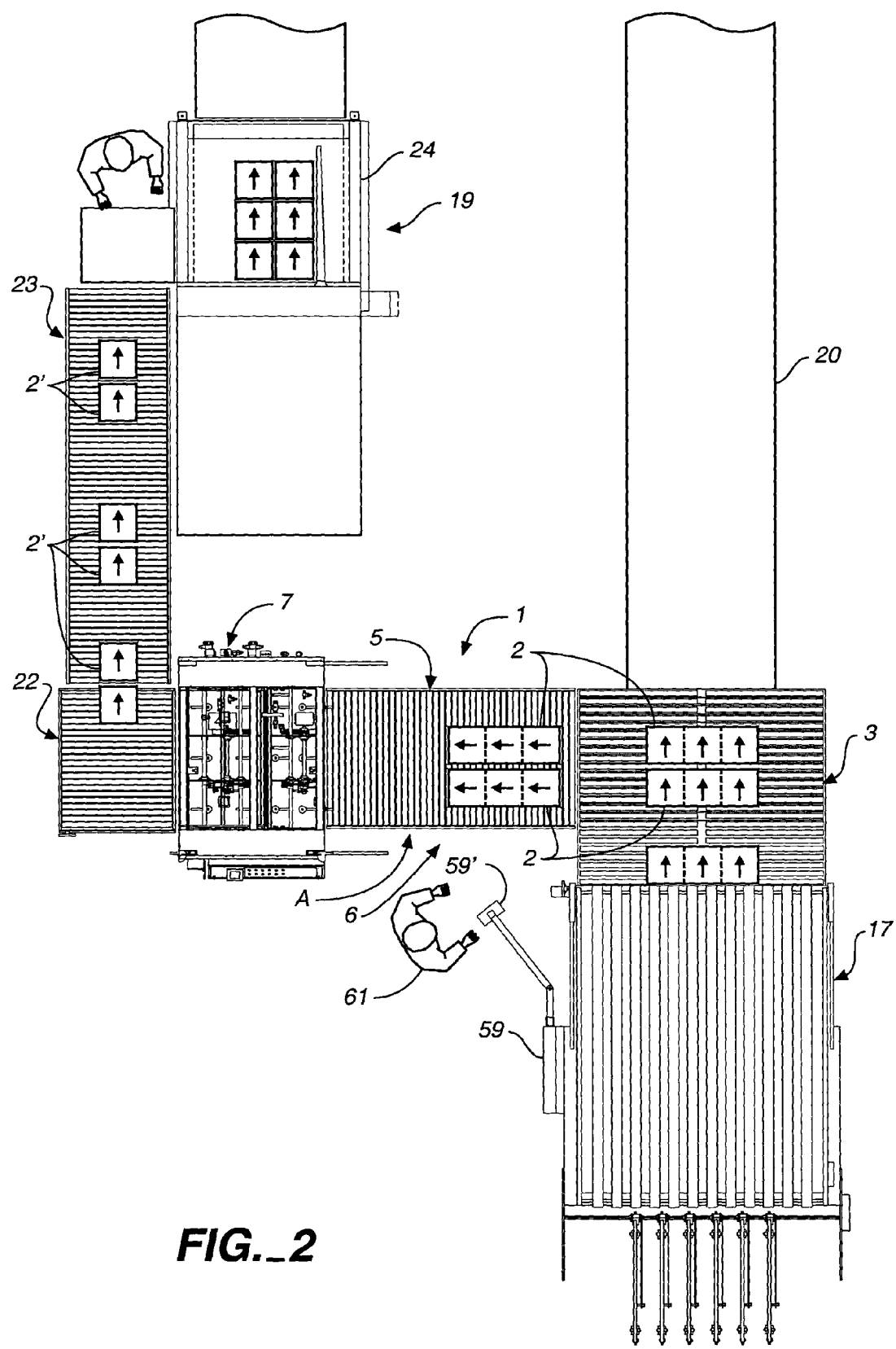
FIG. 2 is a schematic plan view of a storable transfer conveyor 5 of the present invention moved into an operating position between the prior art modified bundle breaker machine 7 and a Geo. M. Martin BOS™ Bundle Transfer System on Scissors Lift 3 where conveyors are at a bundle conveyor elevation of 30" to 42". Bundles 2 proceed to the powered storable transfer conveyor 5 to the modified bundle breaker 7. After the bundles 2 are broken into smaller bundles 2', they move to a station 19 where they are assembled into a pallet load by a prior art machine 24.

In a first embodiment of the present invention, illustrated in FIG. 2, a storable transfer conveyor system 1 is provided for moving bundles 2 from an upstream conveyor 3 to a downstream conveyor 4.

The storable transfer conveyor system 1 is shown in FIG. 2 and consists of a storable transfer conveyor 5 in a first operative position A located adjacent to the upstream conveyor 3 and positioned to deliver bundles 2 to the downstream conveyor 4.

Figure 1:
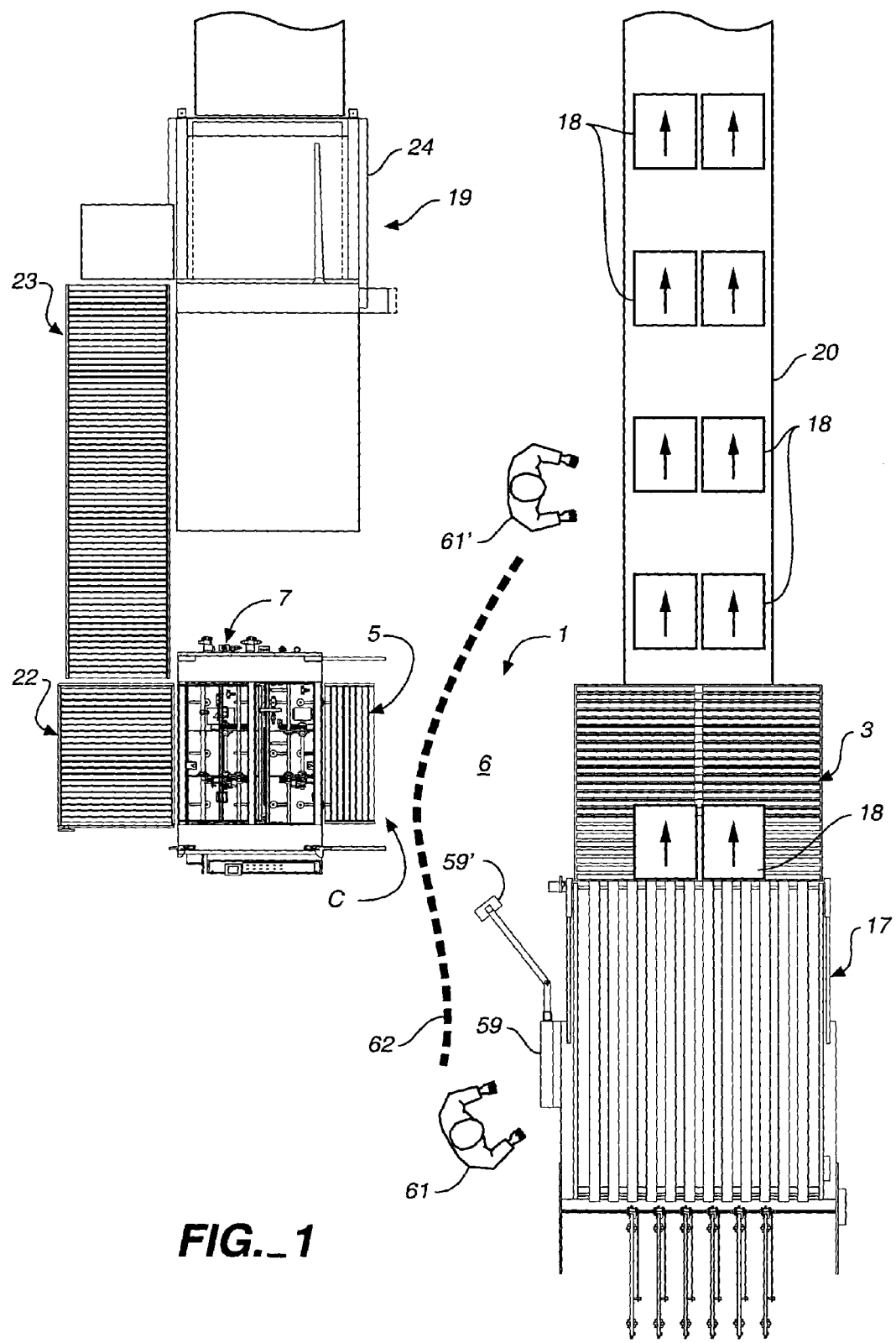
FIG. 1 is a plan view schematic of the powered storable transfer conveyor system 1 where the conveyors are at floor conveyor elevation of about 12", showing storable transfer conveyor 5 of the present invention stored within modified bundle breaker machine 7. Modified bundle breaker machine 7 and storable transfer conveyor 5 are shown in a nonoperating mode. Full stacks 18 have just been discharged from prior art upstacker 17 onto prior art upstream conveyor 3 which may be a Geo. M. Martin Company BOS™ Bundle Transfer System on Scissors Lift. The full stacks are discharged to a floor conveyor 20.

As shown in FIG. 1, the storable transfer conveyor 5 is moveable to a second stored position C in elevational juxtaposition with the downstream conveyor 4, substantially vacating the floor area 6 formerly occupied by the storable transfer conveyor 5 in the first operative position A.

Figure 3:
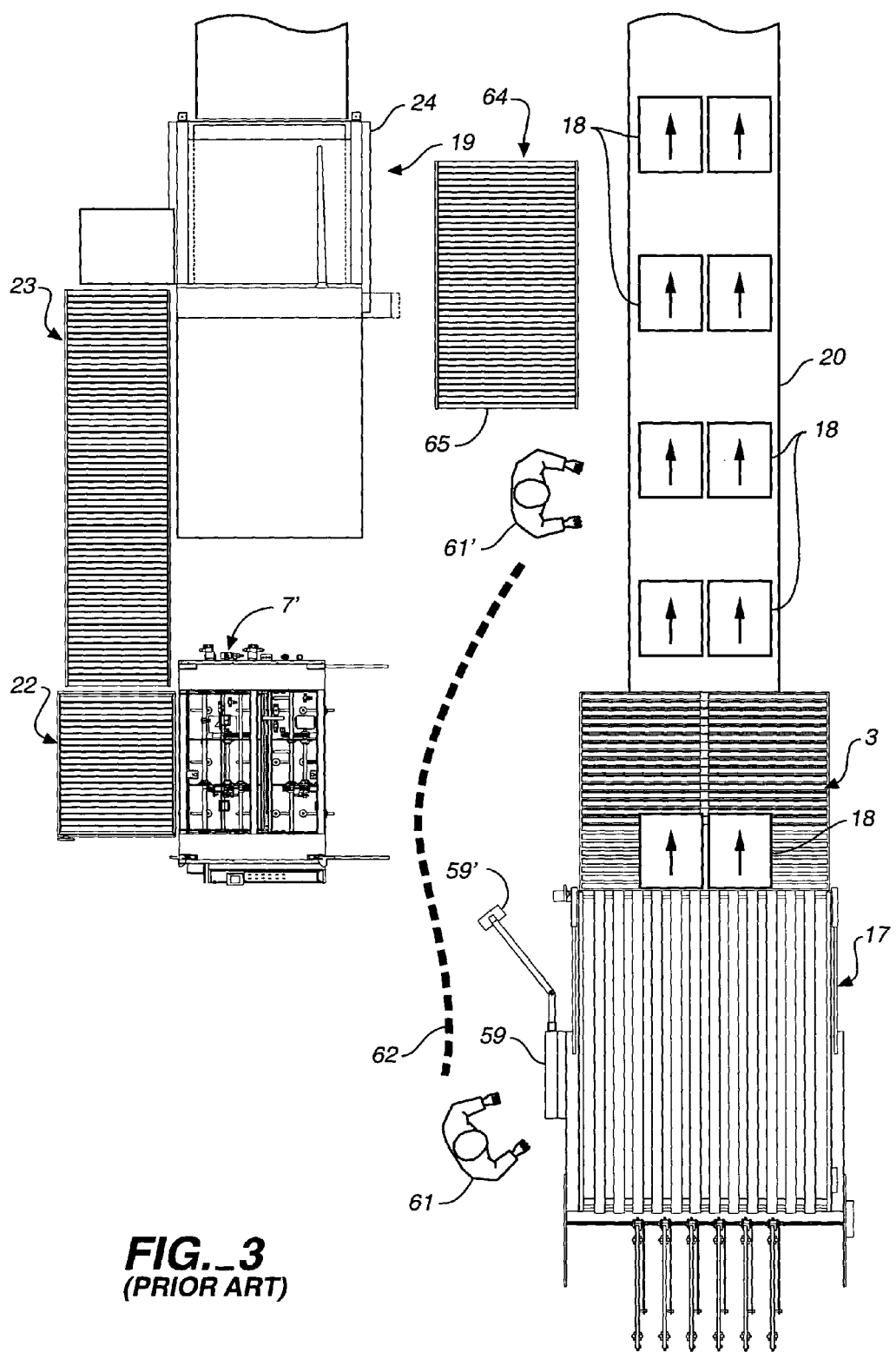
FIG. 3 is a schematic plan view of a Prior Art mobile roll out take away transfer conveyor 64 parked at a location 65 remote from both the prior art stacker 17 and the prior art unmodified bundle breaker 7' so that the operator 61 can move quickly and easily from his normal operating station near controls 59 or remote boom control station 59' along pathway 62 to a second station designated 61'. Full stacks 18 move from the upstacker 17 to the up stream conveyor 3 to the floor conveyor 20. Prior Art Bundle Breaker 7' is shown but is presently out of service.

In its simplest form, the downstream conveyor may be any standard conveyor. For example, the conveying distance to a downstream machine such as a bundle breaker 7 as shown in FIGS. 1, 2 and 3, may be a relatively great distance and require several conveyors before the bundle breaker 7 is reached. In such event, storable transfer conveyor 5 may be stored either under or above such a standard conveyor.

In its simplest form, the downstream conveyor 4 need not have powered rollers or belts. In this form of the invention, the storable transfer conveyor 5 may be simply raised or lowered, and pushed under or over downstream conveyor 4.

Further, storable transfer conveyor 5 need not have powered rollers. Bundles 2 may simply travel by gravity down an inclined slope on storable transfer conveyor 5 or be moved by any other hand or powered means.

Figure 4:
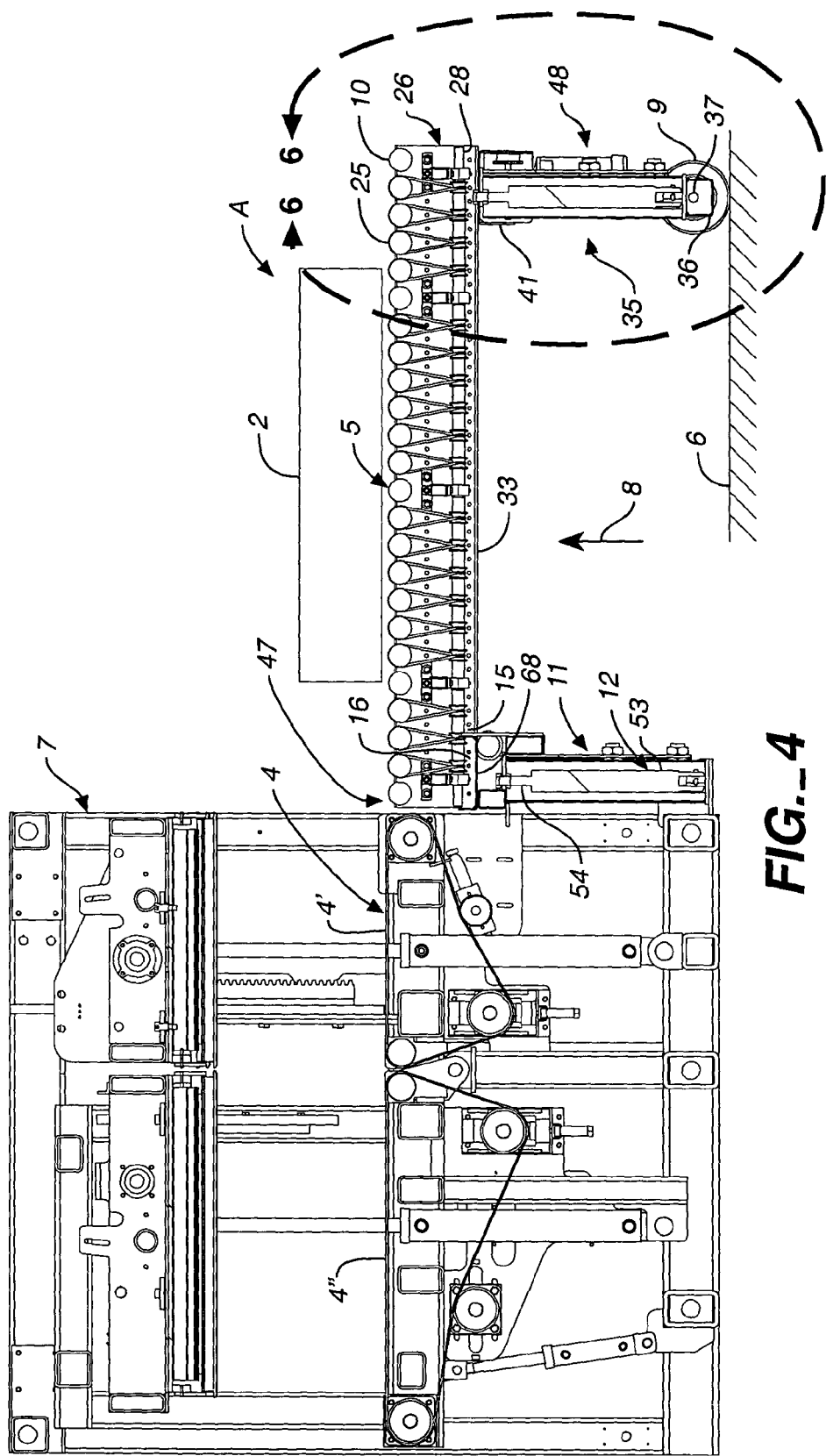
FIG. 4 is side view, partially in section, of an existing but modified Martin bundle breaker 7 operatively connected to a storable transfer conveyor 5 of the present invention in a bundle transfer operating mode.
Figure 5:
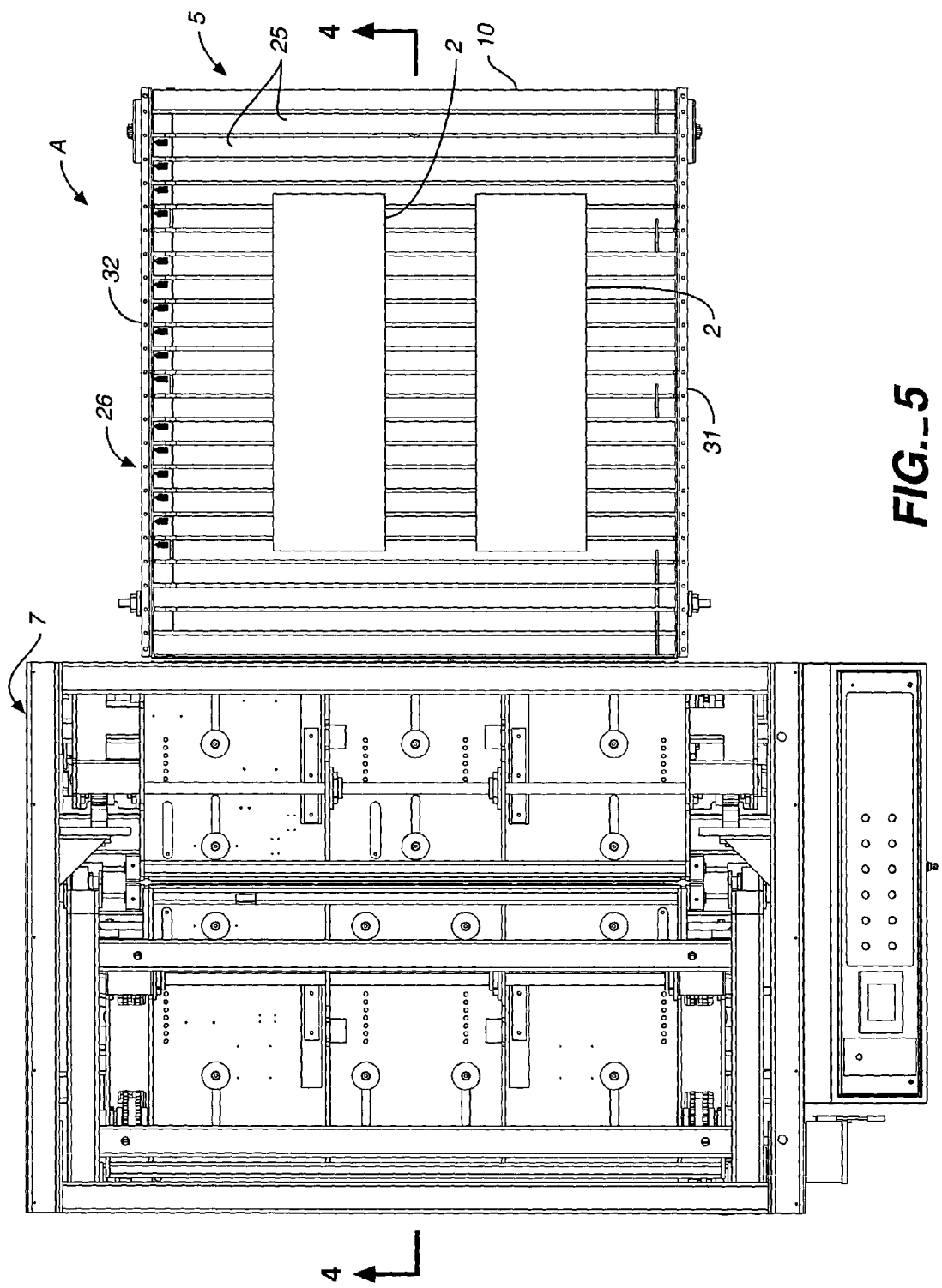
FIG. 5 is a top plan view of the modified Martin bundle breaker 7 shown in FIG. 4 connected to a powered storable transfer conveyor of the present invention.
Figure 8:
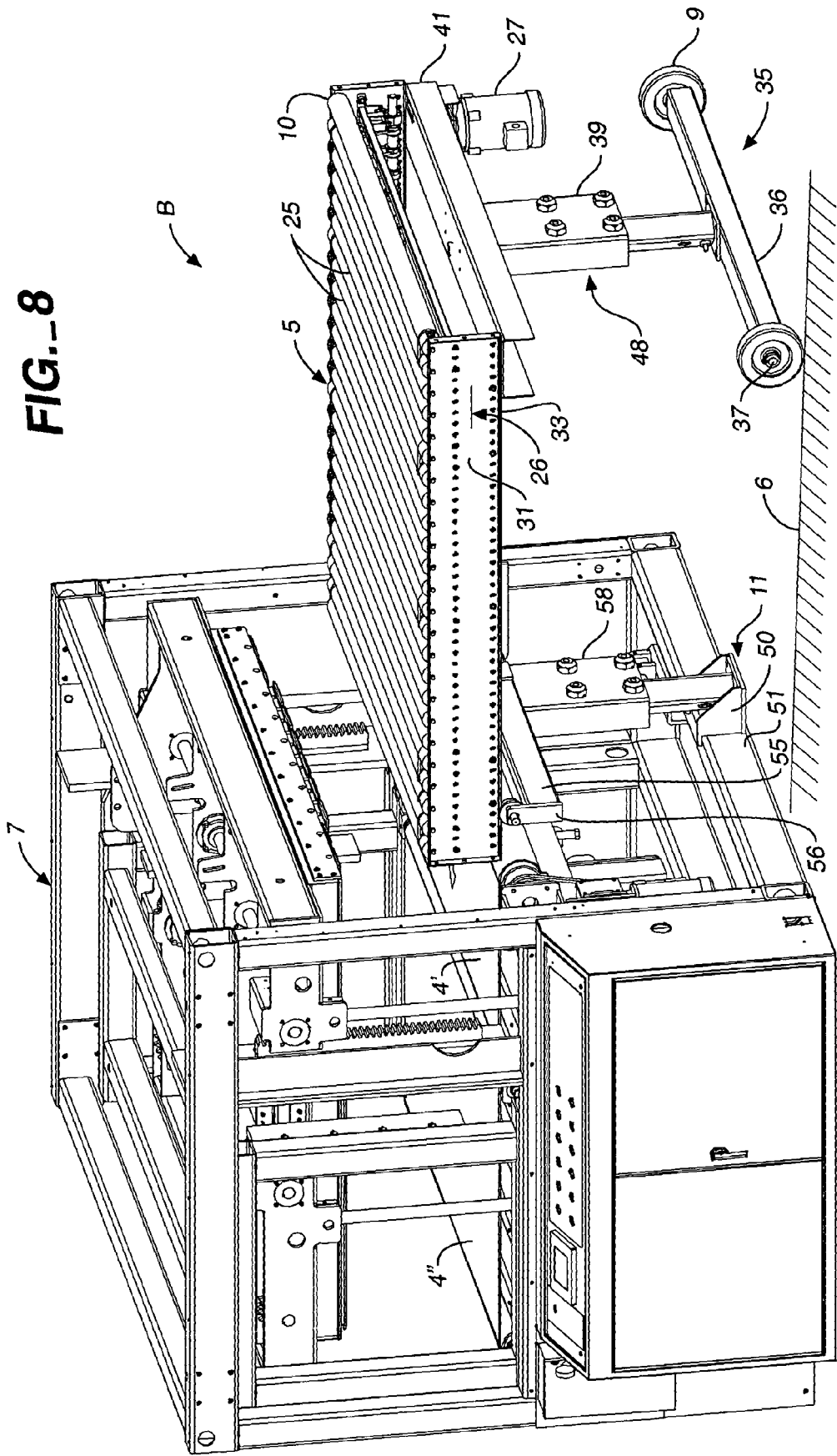
FIG. 8 is a perspective view of the existing modified bundle breaker 7 shown in FIG. 4 with the storable transfer conveyor of the present invention shown in a raised but not stored position
Figure 9:
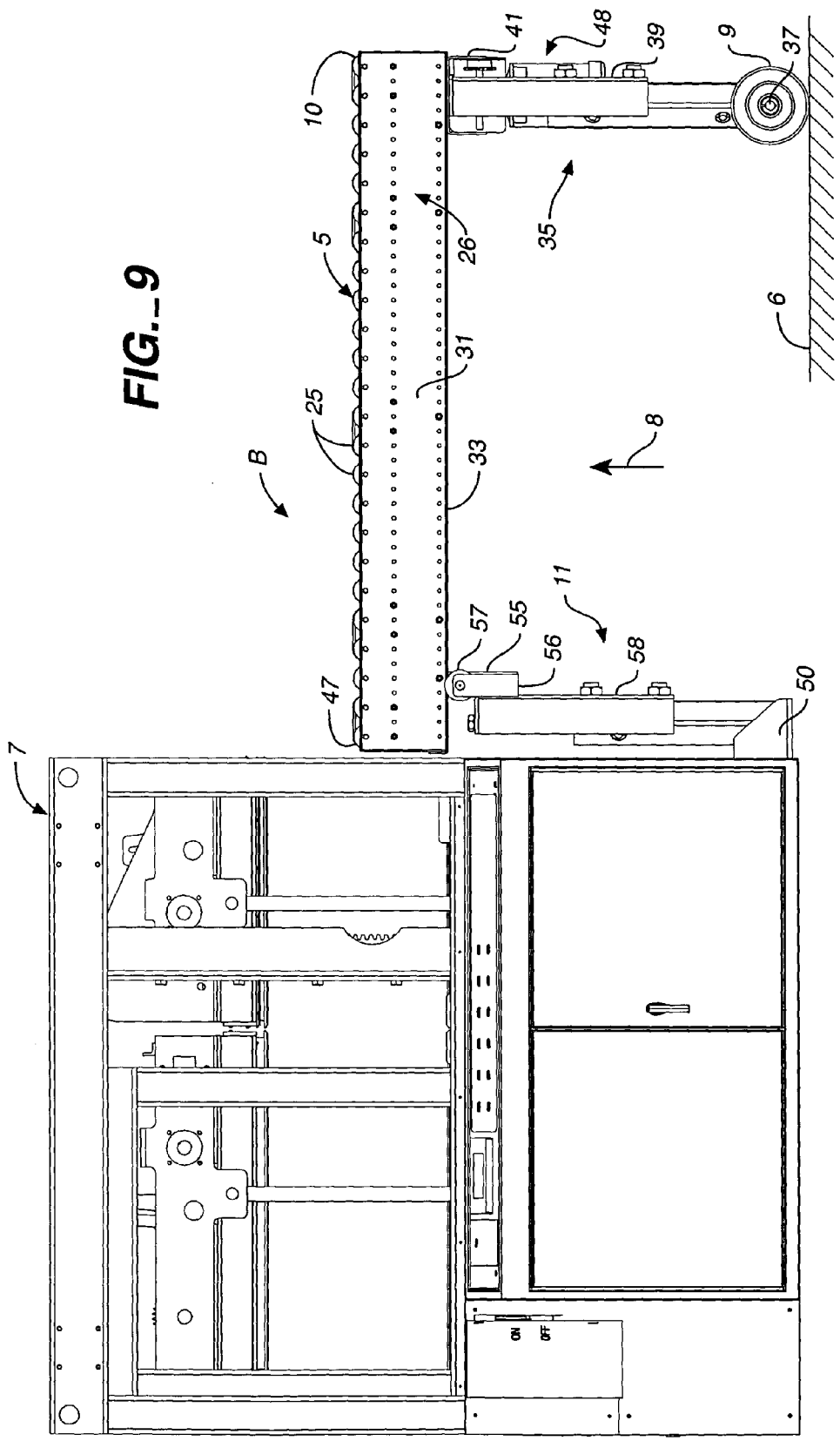
FIG. 9 is a side view of the bundle breaker of FIG. 8 with the storable transfer conveyor of the present invention shown in a raised position.

In another preferred form of the invention, as illustrated in FIGS. 1, 2 and 4 of the drawings, the present invention is a transfer conveyor system 1 for moving bundles 2 from an upstream conveyor 3 to a powered downstream conveyor 4 and includes: a storable transfer conveyor 5 in a first operative position A, as illustrated in FIG. 2, located adjacent to the upstream conveyor 3 and positioned to deliver the bundles 2 to the powered downstream conveyors 4' and 4"; and the storable transfer conveyor 5 is moveable to a raised position B, as shown in FIGS. 8, 9 and 10, for powered movement by the powered downstream conveyor 4 to a second stored position C, illustrated in FIG. 12, at an elevated level on top of the powered downstream conveyor 4 substantially vacating the floor area 6 occupied by the storable transfer conveyor 5 in the first operative position A.

Figure 6:
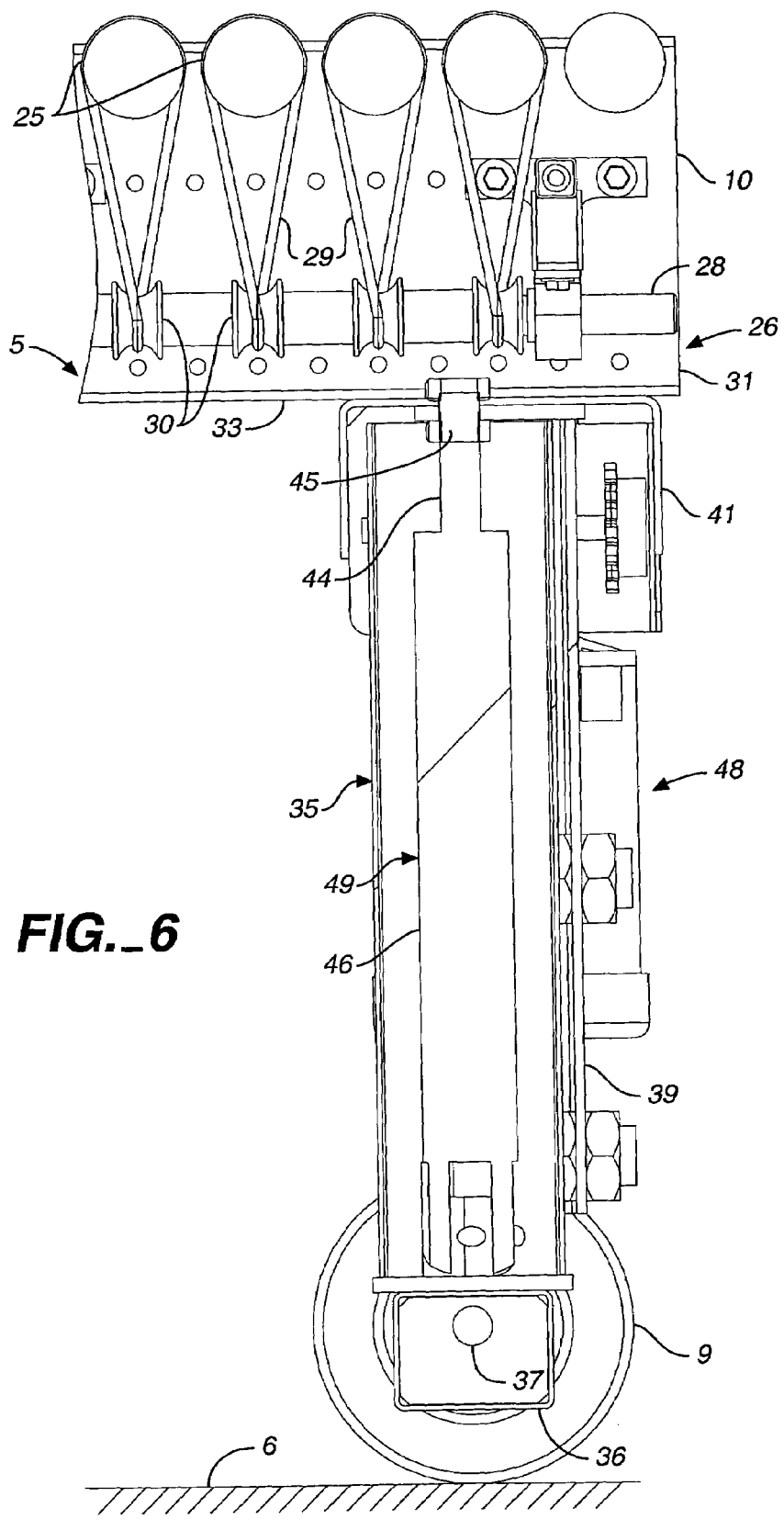
FIG. 6 is an enlarged view of a portion of the powered storable transfer conveyor of the present invention taken in the vicinity of line 6—6 in FIG. 4.

Storable transfer conveyor 5 in a preferred form of the invention is more clearly shown in FIG. 6 and has powered rollers 25 which may be powered by belts 29 driven by powered shaft 28.

As illustrated in FIG. 12 storable transfer conveyor 5 is stored on top of downstream conveyor 4 and downstream conveyor 4 has powered pulling means such as powered belt conveyors 4' and 4" as shown in FIG. 4 for pulling storable transfer conveyor 5 onto downstream conveyor 4.

Referring to FIG. 4, lift means, as indicated by arrow 8 is provided for raising the storable transfer conveyor 5 so that it can be pulled onto downstream conveyor 4 by powered belt conveyors 4' and 4".

As noted in FIG. 1, in transfer conveyor system 1, the storable transfer conveyor 5 is preferably positioned adjacent and in line with the upstream conveyor 3, but at an angle of 90° to a stacker 17.

In the preferred form of the storable transfer conveyor system 1 storable transfer conveyor 5 is stored on top of downstream conveyor 4 where downstream conveyor 4 has pulling means such as powered downstream belt conveyors 4' and 4" for pulling storable transfer conveyor 5 onto downstream conveyor 4.

Downstream conveyor 4 is best shown in FIG. 4 where it is part of bundle breaker 7. Downstream conveyor 4 may include two separate belt conveyors 4' and 4" as shown in FIG. 4.

Storable transfer conveyor 5 illustrated in FIGS. 1, 2 and 4–15, may be an endless belt, powered rollers, or other type conveyor capable of transporting bundles of sheet material. A preferred form of storable transfer conveyor 5 with multiple rollers illustrated in FIG. 6 includes a plurality of closely spaced rollers 25 journaled for rotation on a frame 26 and powered by a motor 27 illustrated in FIG. 14 which drives shaft 28; best shown in FIG. 6. Belts 29 engage pulleys 30 mounted on drive shaft 28 and grooves (not shown) in each roller 25.

The storable transfer conveyor system 1 as above described and particularly shown in FIGS. 1, 6, 7, and 13 may also include a storable transfer conveyor 5 which has lift means 8 which includes a down stream lift mechanism 11 and an upstream lift mechanism 48 for raising the storable transfer conveyor 5 so that it can be pulled onto downstream conveyor 4 by downstream powered belt conveyors 4' and 4" shown in FIGS. 4 and 8.

In transfer conveyor system 1, where the powered downstream conveyor 4 is part of a bundle breaker machine 7, the lift means or lifting mechanism 8 preferably includes a downstream lift mechanism 11 mounted on the bundle breaker machine 7 for lifting the downstream end 47 of the storable transfer conveyor 5. Lifting mechanism 8 preferably also includes an upstream lift mechanism 48 mounted on the upstream end 10 of the transfer conveyor 5.

In transfer conveyor system 1, the downstream lift mechanism 11 preferably includes a hydraulic lift mechanism 12 and upstream lift mechanism 48 includes a hydraulic lift mechanism 49.

Another option configuration may also include motorized caster wheels 9 for moving storable transfer conveyor 5 over downstream conveyor 4 should downstream conveyor 4 not have the drive capability to move storable transfer conveyor 5.

Figure 7:
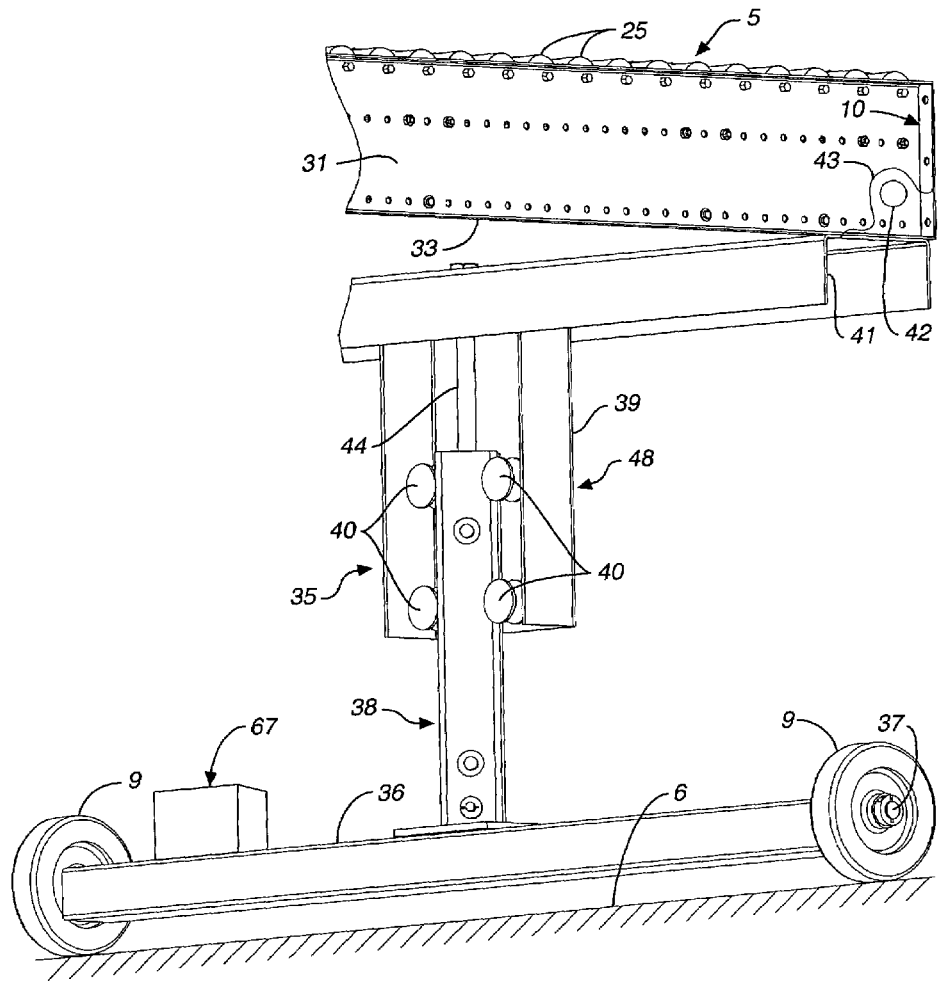
FIG. 7 is an enlarged view of a portion of the storable transfer conveyor of the present invention illustrated in FIG. 8, but taken from a different angle.

To power wheels 9, a motor 67 shown in FIG. 7 may be mounted on base member 36 and operably connected by well known means (not shown) to wheels 9.

In a preferred embodiment of the transfer conveyor system 1 as previously described the downstream conveyor 4 is part of a bundle breaker machine 7, as illustrated e.g. in FIGS. 8 and 9.

Generally, in the transfer conveyor system 1 of the present invention, lifting mechanism 8 as shown generally by arrow 8 in FIG. 4, is provided for raising the storable transfer conveyor 5 to the raised position B, as illustrated in FIGS. 8, 9 and 10 for movement of the storable transfer conveyor 5 to the second stored position C on top of the powered downstream conveyor 4, as illustrated in FIGS. 12 and 13. The lifting mechanism 8 lowers the storable transfer conveyor 5 when the storable transfer conveyor 5 is moved from the second stored position C via position B to the first operative position A.

The storable transfer conveyor 5 may include a pair of wheels 9, as illustrated e.g. in FIGS. 6, 7 and 8, for supporting and moving the upstream end 10 of the storable transfer conveyor 5 during movement of the storable transfer conveyor 5 from the first operative position A to the second stored position C. The wheels 9 need not be motorized as set forth above and the storable transfer conveyor 5 may be moved by manual power or pulled by powered downstream belt conveyors 4' and 4" as described below.

In the preferred form of the storable transfer conveyor system 1, the downstream conveyor 4 is part of a bundle breaker machine 7 and bundles 2 are nicked so that bundles 2 may be broken into smaller bundles 2' in bundle breaker machine 7.

In storage transfer conveyor system 1, the storage transfer conveyor 5 includes electrical power cables (not shown) and power control lines (not shown) connecting the storage transfer conveyor 5 and the bundle breaker machine 7 which need not be disconnected and reconnected when the storage transfer conveyor 5 is moved from the first operative position A to the second stored position C or back again to the first operative position A.

In a storable transfer conveyor system 1 as described, preferably a safety feature is provided as illustrated in FIG. 4 which may consist of a cross member 16 including a projection surface or member mounted on the storable transfer conveyor 5 and a stop member 15 operably mounted on the bundle breaker machine 7, preferably on down stream lift mechanism 11 for contacting the projection surface of cross member 16 for preventing the storable transfer conveyor 5 from accidentally falling to the floor area 6 when the powered transfer conveyor 5 is moved from the second stored position C to the first operative position A.

FIGS. 1 and 2 are schematic drawings of several machines on a factory floor which may work in conjunction with the storable transfer conveyor system 1 of the present invention.

Individual sheets, such as corrugated paper board are received from a corrugator, rotary die cutter, printer or other machines (not shown), and assembled into stacks 18 by a stacker 17. Stackers are common and one such stacker is fully described in U.S. Pat. No. 2,901,250 granted to Martin on Aug. 25, 1959. As shown in FIG. 1, a full stack of sheets 18 might be assembled by the stacker 17 and routed to downstream operations via powered floor conveyors 20.

Stacker 17 may also assemble sheets formed with score lines into stacks which may be referred to as bundles 2. Where it is desirable to break a large bundle 2 into one or more smaller bundles 2', the large bundles 2 are received from stacker 17 on upstream conveyor 3 and transported to storable transfer conveyor 5 where they are fed into bundle breaker machine 7 where they are broken along score lines in the sheets into smaller bundles 2'. Bundle breakers are well known in the art, one of which is fully described in U.S. Ser. No. 10/229,891 filed Aug. 28, 2002 by Daniel J. Talken and Merrill D. Martin and assigned to the Martin Family Trust. The smaller bundles 2' may be transferred to Station 19 via a right angle conveyor 22 and conveyor 23 where they are prepared for shipment on pallets using load forming equipment 24.

Conveyor frame 26 includes side rails 31 and 32 having generally planar elongated surface faces 33 and 34 which engage powered downstream conveyors 4. Additionally, cross member 16 shown in FIG. 4 is connected between side rails 31 and 32 with the face 68 generally aligned with surfaces 33 and 34. This increases the surface area for engaging down stream conveyors 4.

In the preferred form, storable transfer conveyor system 1 as shown in FIGS. 1 and 2, a lifting means as indicated by arrow 8 shown in FIG. 4 is provided for raising the storable transfer conveyor 5 to a raised position B as shown in FIGS. 8, 9, and 10 for movement to a second stored position C shown in FIG. 13 on top of downstream conveyor 4. Lifting mechanism 8 also lowers storable transfer conveyor 5 when storable transfer conveyor 5 is moved from second stored position C to a first operative position A shown in FIG. 4.

In the preferred form of the invention, storable transfer conveyor system 1 as shown in FIG. 4, for example, includes storable transfer conveyor 5 which is provided with a pair of wheels 9 for supporting and moving the upstream end 10 of transfer conveyor 5 during movement of powered storable transfer conveyor 5 from first operative position A to second stored position C.

Preferably lifting means designated by arrow 8 in FIG. 4 for lifting storable transfer conveyor system 1 includes a downstream lift mechanism 11 illustrated in FIG. 13 mounted on bundle breaker machine 7 for lifting the downstream end 47 of storable transfer conveyor 5, and an upstream lift mechanism 48 shown in FIGS. 4 and 6 mounted on upstream end 10 of storable transfer conveyor 5 for lifting upstream end 10 of storable transfer conveyor 5.

The downstream lift mechanism 11 used to raise the downstream end 47 of storable transfer conveyor 5 is best illustrated in FIGS. 8 and 9, and is also shown in FIGS. 4, 10, and 13. A base 50 is attached to base frame member 51 of bundle breaker machine 7 and supports fixed frame stud 52.

As shown in FIG. 4, downstream lift mechanism 11 preferably is a hydraulic lift mechanism 12 which includes a hydraulic cylinder 53 mounted on base 50 and hydraulic piston rod 54 connected to cross frame channel member 55 and elevating support frame 58. Wheel supports 56 connected to cross frame channel member 55 rotatably support wheels 57 which respectively engage generally planar elongated surface face 33 of side rail 31 and generally planar elongated surface face 34 of side rail 32.

Frame 26 is supported at its upstream end 10 by an elevating mobile frame 35, best shown in detail views in FIGS. 6 and 7. Elevating mobile frame 35 includes a base member 36 which receives axle 37, upon which wheels 9 are rotatably mounted, and supports frame stud 38.

Upstream lift mechanism 48 for lifting the upstream end 10 of storable transfer conveyor 5 is illustrated in FIGS. 6 and 7. An elevating channel support frame 39 fitted with guide rollers 40 shown in FIG. 7, which ride along the side edges of frame stud 38, is connected to cross frame channel member 41. Frame 26 is pivotally connected to cross frame channel member 41 by a pin 42 mounted in pin bracket 43. Frame 26 of storable transfer conveyor 5 is lifted by hydraulic lift mechanism 49 shown in FIG. 6 which includes hydraulic piston rod 44 attached to cross frame channel member 41 by fitting 45 and reciprocally mounted in hydraulic cylinder 46 attached to base member 36.

As best shown in FIG. 4, powered downstream conveyor 4, may consist of two independently powered belt conveyors 4' and 4" which are designed to transport bundles 2 and small bundles 2' as well as to receive and pull downstream on generally elongated surface faces 33 and 34 of side rails 31, and 32 respectively and face 68 of cross member 16 or to operate in the opposite direction and eject storable transfer conveyor 5 from bundle breaker machine 7.

Operation of the transfer conveyor system 1 is as follows: Referring to FIG. 2, when a plurality of sheets are formed into a bundle 2 by stacker 17 and conveyed by upstream conveyor 3 to storable transfer conveyor 5, storable transfer conveyor 5 should be in first operative position A as illustrated in FIGS. 2 and 4 to receive them. Bundle 2 is then moved by powered rollers 25 to powered downstream belt conveyor 4', then to powered downstream belt conveyor 4" after being broken into small bundles 2' by the action of bundle breaker machine 7. Small bundles 2' are then conveyed to station 19 via conveyors 22 and 23 as shown in FIG. 2.

When the run of bundles 2 to bundle breaker machine 7 is completed, stacker 17 is programmed to deliver bundles to floor conveyor 20 as shown in FIG. 1. In most operations, it is essential that the operator of stacker 17 be able to move from the control panel 59 or remote boom control panel 59' to floor conveyor 20 when full stacks 18 are being delivered to floor conveyor 20. Hence, it is imperative to remove storable transfer conveyor 5 from floor area space 6.

In the present invention, storable transfer conveyor 5 is removed from floor area space 6 as follows. First, the operation of powered rollers 25 is shut down. Hydraulic lift mechanism 12 on bundle breaker machine 7, and upstream lift mechanism 48 on elevating mobile frame 35 are then activated. Storable transfer conveyor 5 is then raised from a first operative position A as viewed in FIGS. 2 and 4 to an elevated raised position B as viewed in FIGS. 8, 9, and 10. After storable transfer conveyor 5 is fully raised, the operator moves storable transfer conveyor 5 toward bundle breaker machine 7 until the downstream end 47 (see FIG. 10) is in touching contact with powered downstream belt conveyor 4'. This operation may be powered, but at the present time all that is necessary is for the operator to give storable transfer conveyor 5 a slight nudge in the direction of powered downstream belt conveyor 4'. Once the downstream end 47 of storable transfer conveyor 5 is in contact with powered downstream belt conveyor 4', the operator merely activates powered downstream belt conveyors 4' and 4" and transfer conveyor 5 moves on powered downstream belt conveyors 4' and 4", wheels 57, and wheels 9 until storable transfer conveyor 5 reaches second stored position C as shown in FIGS. 12, 13 and 14. This entire operation takes less than two minutes.

To place storable transfer conveyor 5 back in first operative position A as shown in FIGS. 2 and 4, the process is simply repeated in reverse order. Again, the operation takes less than two minutes.

I claim:

1. An efficient factory production line transition storable transfer conveyor system for selectively moving bundles from an upstream conveyor, having an upstream end and a downstream end, to a downstream conveyor having selectively operating and non-operating modes comprising:
    a. a storable transfer conveyor in a first operative position, temporarily, exclusively occupying a floor area and the air space there above and located adjacent to said upstream conveyor impeding access by an operator between said upstream and downstream ends of said upstream conveyor and positioned to selectively deliver said bundles to said downstream conveyor when said downstream conveyor is in said operating mode; and
    b. said storable transfer conveyor being selectively moveable to a second stored position in elevational juxtaposition with said downstream conveyor when said downstream conveyor is in said non-operating mode, substantially vacating said floor area and said air space there above formerly, temporarily, exclusively occupied by said storable transfer conveyor in said first operative position and permitting free unimpeded access and travel by said operator through said floor area when said storable transfer conveyor is in said second stored inoperative position;
    c. said storable transfer conveyor is placed on top of a portion of said downstream conveyor; and
    d. said downstream conveyor has powered pulling means for pulling said storable transfer conveyor onto a substantial portion of said downstream conveyor.

2. A storable transfer conveyor system as described in claim 1 comprising:
    a. said storable transfer conveyor has powered rollers.

3. A storable transfer conveyor system as described in claim 1 comprising:
    a. lift means for raising said storable transfer conveyor so that it can be pulled onto said downstream conveyor by said powered pulling means.

4. A storable transfer conveyor system as described in claim 1 comprising:
    a. said lift means for said storable transfer conveyor includes an upstream lift mechanism and a downstream lift mechanism for raising said storable transfer conveyor so that it can be pulled onto said downstream conveyor by said downstream powered means.

5. A storable transfer conveyor system as described in claim 4 comprising:
    a. motorized caster wheels for moving said storable transfer conveyor over said downstream conveyor.

6. A storable transfer conveyor system as described in claim 1 comprising:
    a. said downstream conveyor is part of a bundle breaker machine; and
    b. said bundles are nicked so that bundles may be broken into smaller bundles in said bundle breaker machine.

7. A storable transfer conveyor system as described in claim 6 comprising:
    a. said storable transfer conveyor is placed on top of a portion of said downstream conveyor; and
    b. said downstream conveyor has powered pulling means for pulling said storable transfer conveyor onto a substantial portion of said downstream conveyor and into said stored second position.

8. A storable transfer conveyor system as described in claim 7 comprising:
    a. a lifting means is provided for raising said storable transfer conveyor to a raised position for movement to a second stored position on top of said downstream conveyor and said lifting means also lowers said storable transfer conveyor when said powered storable transfer conveyor is moved from said second stored position to said first operative position.

9. A storable transfer conveyor system as described in claim 1 wherein:
    a. said storable transfer conveyor includes a pair of wheels for supporting and moving the upstream end of said transfer conveyor during movement of said storable transfer conveyor from said first operative position to said second stored position.

10. A storable transfer conveyor system as described in claim 8 wherein:
    a. said lifting means includes a downstream lift mechanism mounted on said bundle breaker machine for lifting the downstream end of said storable transfer conveyor and an upstream lift mechanism mounted on said upstream end of said storable transfer conveyor for lifting said upstream end of said storable transfer conveyor.

11. A storable transfer conveyor system as described in claim 10 wherein:
    a. said downstream lift mechanism for lifting the downstream end of said storable transfer conveyor includes a hydraulic lift mechanism; and b. said upstream lift mechanism includes a hydraulic lift mechanism.

12. A storable transfer conveyor system as described in claim 10 comprising:
   a. said storable transfer conveyor has powered rollers; and
   b. said storable transfer conveyor includes electrical power cables and power control lines connecting said storable transfer conveyor and said bundle breaker machine which need not be disconnected and reconnected when said storable transfer conveyor is moved from said first operative position to said second stored position or back again to said first operative position.

13. A storable transfer conveyor system as described in claim 12 comprising:
   a. a projection member operably mounted on said storable transfer conveyor; and
   b. a stop member operably mounted on said bundle breaker machine for contacting said projection member for preventing said storable transfer conveyor from falling to said floor area when said storable transfer conveyor is moved from said second stored position to said first operative position.

* * * * *